(12) United States Patent  (10) Patent No.: US 7,192,085 B2
Lee  (45) Date of Patent: Mar. 20, 2007

(54) SADDLE DEVICE

(76) Inventor: Daniel Lee, No. 323, Chung-Hua Rd., Nantou City (TW)

( * ) Notice: Subject to any disclaimer, the term of this patent is extended or adjusted under 35 U.S.C. 154(b) by 0 days.

(21) Appl. No.: 11/155,993

(22) Filed: Jun. 17, 2005

(65) Prior Publication Data

US 2006/0284458 A1  Dec. 21, 2006

(51) Int. Cl.
*B62J 1/00* (2006.01)
(52) U.S. Cl. ............... 297/195.1; 297/214; 297/215.16
(58) Field of Classification Search ............ 297/195.1, 297/214, 215.16, 463.2, 452.2, 452.22, 452.27; 40/320
See application file for complete search history.

(56) References Cited

U.S. PATENT DOCUMENTS 3,484,876 A * 12/1969 Thomas .................. 4/234
3,549,441 A * 12/1970 Mesinger et al. ............ 156/79
4,815,361 A *  3/1989 Chiarella .................. 297/214
5,203,607 A *  4/1993 Landi ....................... 297/214
5,397,162 A *  3/1995 Huang ..................... 297/195.1

* cited by examiner

*Primary Examiner*—Peter M. Cuomo
*Assistant Examiner*—Sarah B. McPartlin
(74) *Attorney, Agent, or Firm*—Ladas & Parry LLP (57) ABSTRACT

A saddle device includes a rigid saddle base having a lateral flange extending downwardly from an outer periphery of a support portion. A foam padding is mounted on a convex outer surface of the saddle base. A supporting unit is disposed fixedly under the saddle base. A resilient cushioning unit includes a cushion member having a base portion disposed fixedly between the supporting unit and a concave inner surface of the saddle base, and a cushioning portion that extends integrally and upwardly from the base portion and through a hole in the saddle base and a through hole in the foam padding. A cover layer covers the foam padding, and has a transparent portion aligned with the through hole in the foam padding.

6 Claims, 8 Drawing Sheets

SADDLE DEVICE

BACKGROUND OF THE INVENTION

1. Field of the Invention

The invention relates to a saddle, more particularly to a saddle device that can be fabricated through a simple and smooth procedure.

2. Description of the Related Art

Figure 1:
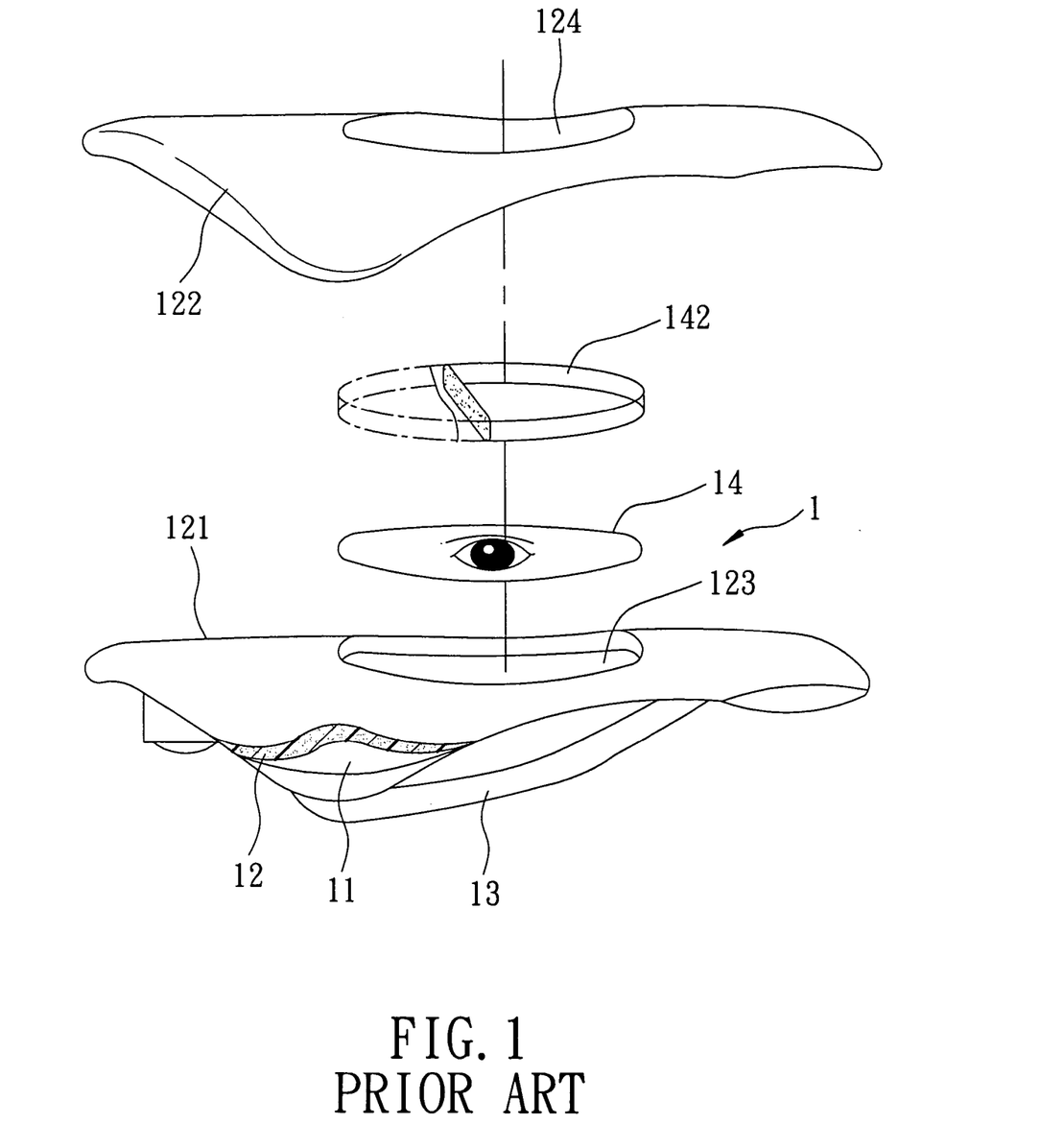
FIG. 1 is an exploded perspective view of a conventional saddle.
Figure 2:
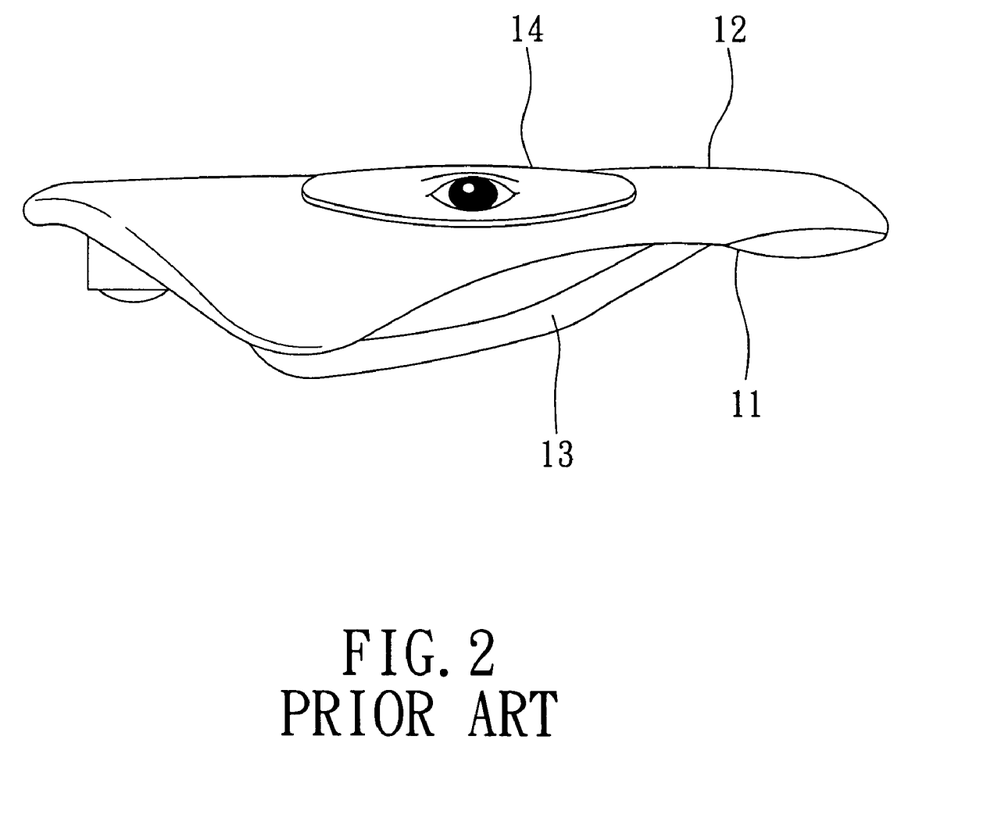
FIG. 2 is an assembled perspective view of the conventional saddle.

Referring to FIGS. 1 and 2, a conventional saddle 1 is shown to include a rigid saddle base 11, a foam padding 12 mounted on the saddle base 11 and having a top surface 121 formed with a recess 123, a supporting frame 13 disposed fixedly under the saddle base 11, a decorative piece 14 disposed in the recess 123 in the foam padding 12, a transparent cushion member 142 disposed in the recess 123 in the foam padding 12 and superposed on the decorative piece 14, and a cover layer 122 for covering the foam padding 12. The cover layer 122 has a transparent portion 124 aligned with the recess 123 in the foam padding 12 such that the decorative piece 14 is visible through the transparent cushion member 142 and the transparent portion 124 of the cover layer 122.

During assembly, the cover layer 122 cannot cover the foam padding 12 until the decorative piece 14 and the cushion member 142 are disposed in the recess 123 in the foam padding 12. Therefore, at least two steps are required for the assembly process of the cover layer 122, the foam padding 12, the cushion member 142 and the decorative piece 14.

SUMMARY OF THE INVENTION

Therefore, the object of the present invention is to provide a saddle device that can be fabricated through a simple and smooth procedure.

According to the present invention, a saddle device comprises:

a rigid saddle base having a support portion, a lateral flange extending downwardly from an outer periphery of the support portion, a concave inner surface, a convex outer surface, and a hole that extends from the outer surface to the inner surface;

a foam padding mounted on the outer surface of the saddle base and formed with a through hole therethrough, the through hole being aligned with the hole in the saddle base;

a supporting unit disposed fixedly under the saddle base;

a resilient cushioning unit including a cushion member having a base portion disposed fixedly between the supporting unit and the inner surface of the saddle base, and a cushioning portion that extends integrally and upwardly from the base portion through the hole in the saddle base and through the through hole in the foam padding; and a cover layer for covering the foam padding, the cover layer having a transparent portion aligned with the through hole in the foam padding.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 3:
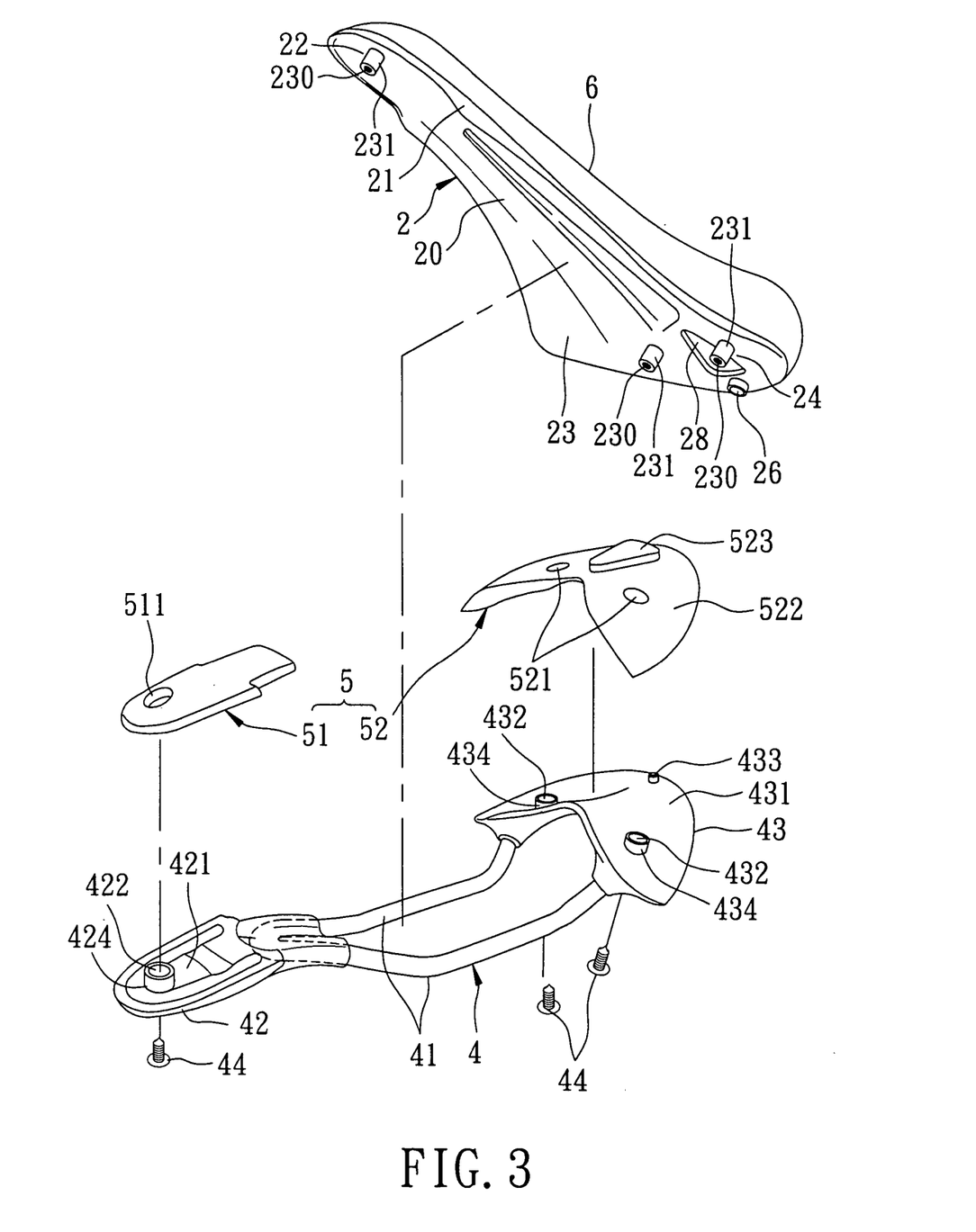
FIG. 3 is an exploded perspective view showing the first preferred embodiment of a saddle device according to the present invention.
Figure 4:
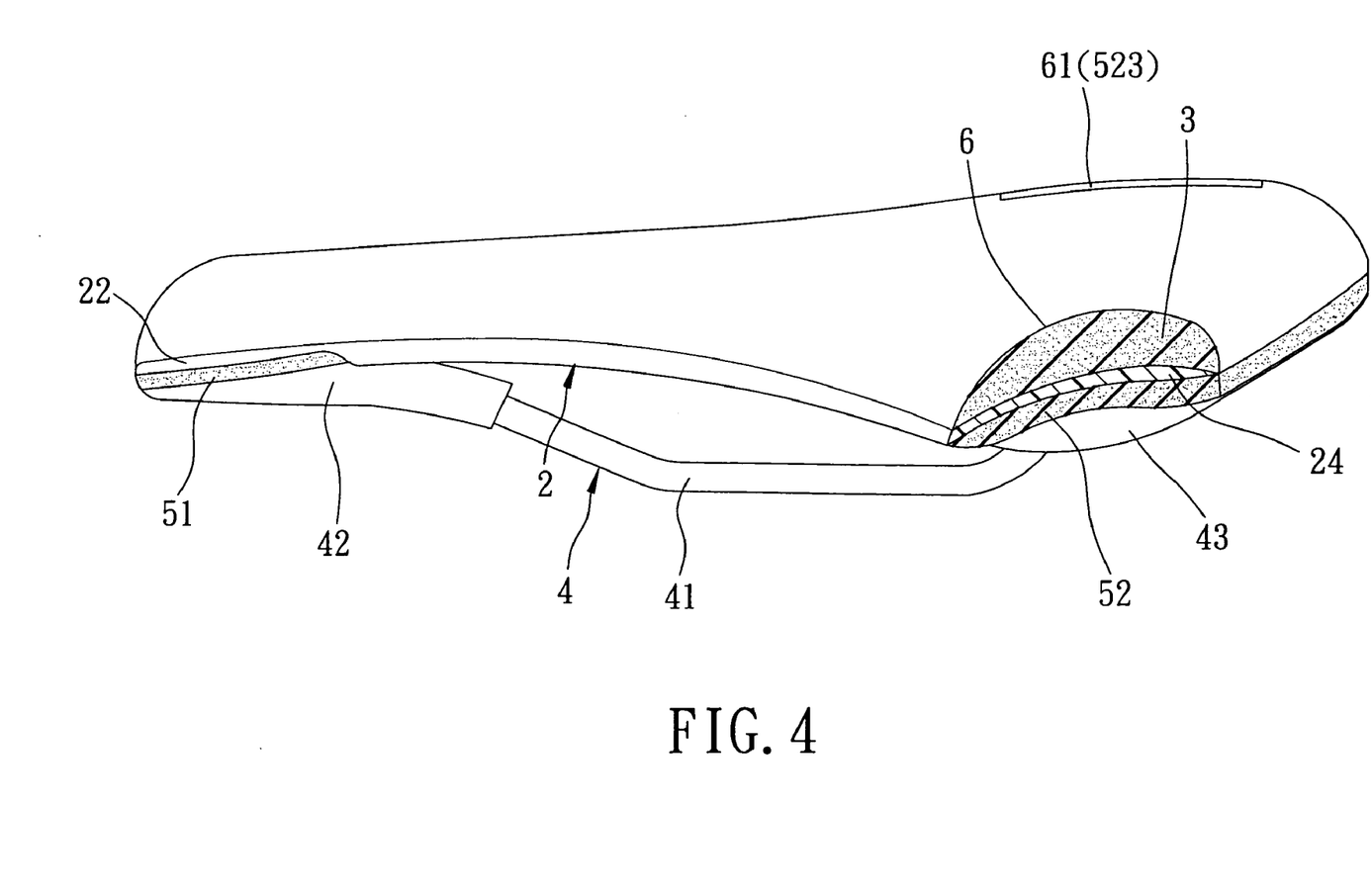
FIG. 4 is a partly cutaway, perspective view showing the first preferred embodiment.
Figure 5:
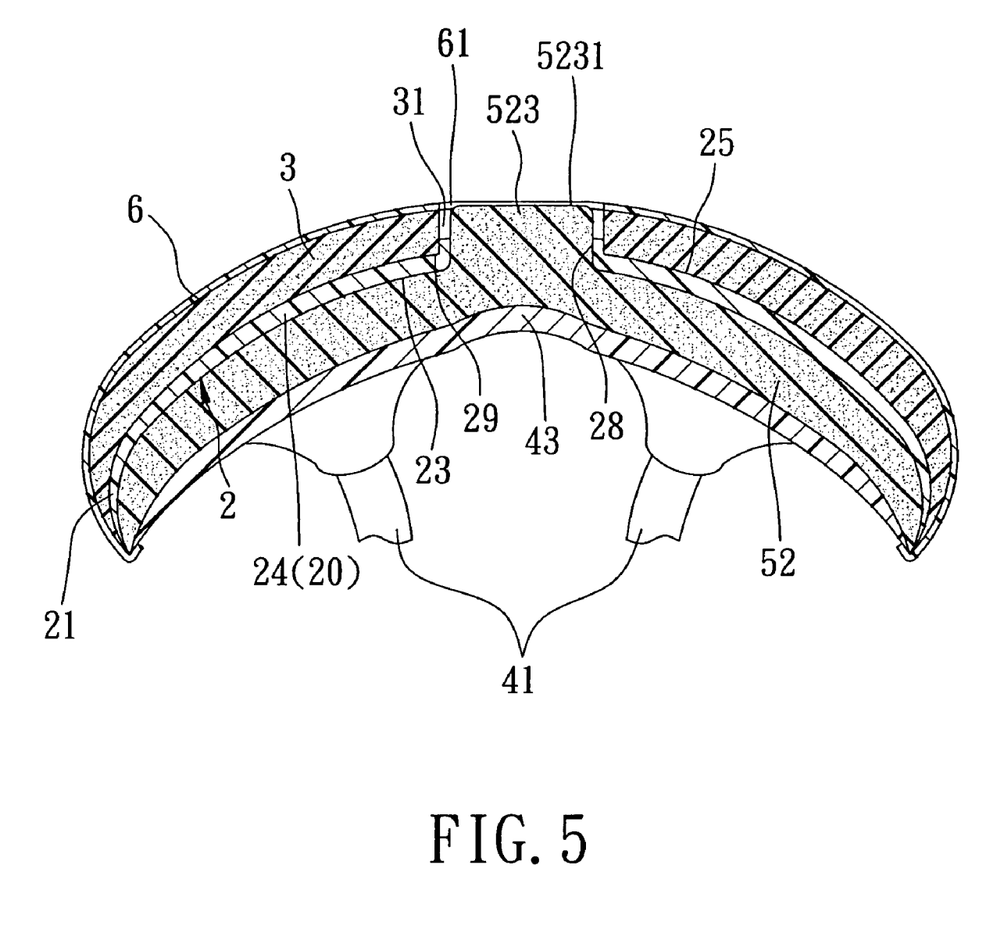
FIG. 5 is a schematic sectional view showing the first preferred embodiment.

Referring to FIGS. 3 to 5, the first preferred embodiment of a saddle device according to the present invention is shown to include a rigid saddle base 2, a foam padding 3, a supporting unit 4, a resilient cushioning unit 5, and a cover layer 6.

The saddle base 2 has a support portion 20, a lateral flange 21 extending downwardly from an outer periphery of the support portion 20, a concave inner surface 23, a convex outer surface 25, and a hole 28 that extends from the outer surface 25 to the inner surface 23. The support portion 20 has a converging part 22, and a diverging part 24 disposed behind and wider than the converging part 22, as shown in FIG. 3. In this embodiment, the hole 28 is formed in the diverging part 24 of the support portion 20. The inner surface 23 of the saddle base 2 is formed with three integral posts 231, one of which is proximate to the converging part 22, and the other ones of which are proximate to the hole 28 in the diverging part 24, as shown in FIG. 3. Each of the posts 231 has a threaded hole 230.

As best shown in FIG. 5, the foam padding 3 is mounted on the outer surface 25 of the saddle base 2, and is formed with a through hole 31 therethrough. The through hole 31 is aligned with the hole 28 in the saddle base 2.

The supporting unit 4 is disposed fixedly under the saddle base 2. In this embodiment, the supporting unit 4 includes a first mounting member 42 mounted on the inner surface 23 of the saddle base and proximate to the converging part 22, a second mounting member 43 mounted on the inner surface 23 of the saddle base 2 and proximate to the diverging part 24, and two supporting rails 41 interconnecting the first and second mounting members 42, 43. The first mounting member 42 has a first mounting surface 421 formed with an upwardly extending positioning post 424. The first mounting member 42 is formed with a hole 422 extending therethrough and further extending through the positioning post 424. The hole 422 permits extension of the corresponding post 231 thereinto. On the other hand, the second mounting member 43 has a second mounting surface 431 formed with two upwardly extending positioning posts 434. The second mounting member 43 is formed with two holes 432 extending therethrough and further extending through the positioning posts 434, respectively. The holes 432 permit the corresponding posts 231 at positions proximate to the diverging part 24 of the supporting portion 20 of the saddle base 2 to extend respectively thereinto.

In this embodiment, the cushioning unit 5 includes a cushion member 52 and a cushion plate 51. The cushion member 52 has a base portion 522 disposed fixedly between the supporting unit 4 and the inner surface 23 of the saddle base 2, and a cushioning portion 523 that extends integrally and upwardly from the base portion 522 and through the hole 28 in the saddle base 2 and the through hole 31 in the foam padding 3, as shown in FIG. 5. The base portion 522 is formed with two holes 521 therethrough. The holes 521 respectively permit extension of the positioning posts 434 of the second mounting frame 43 of the supporting unit 4 therethrough. The cushion plate 51 is disposed between the first mounting member 42 and the inner surface 23 of the saddle base 2. The cushion plate 51 is formed with a hole 511 therethrough. The hole 511 permits extension of the positioning post 424 of the first mounting member 42 of the supporting unit 4 therethrough.

The supporting unit 4 further includes a plurality of headed bolts 44 that extend respectively through the holes 422, 432 in the first and second mounting members 42, 43 and the holes 511, 521 in the cushion plate 51 and the cushion member 52 and that engage respectively the threaded holes 230 in the posts 231 on the inner surface 23 of the saddle base 2 so that the first and second mounting members 42, 43 are mounted respectively on the inner surface 23 of the saddle base 2.

The cover layer 6 covers the foam padding 3, and has a transparent portion 61 aligned with the through hole 31 in the foam padding 3, as shown in FIG. 5. Due to the presence of the transparent portion 61, a top surface 5231 of the cushioning portion 523 may be formed with a decorative pattern (not shown) that is visible through the transparent portion 61.

It is noted that the supporting unit 4 is assembled to the saddle base 2 together with the cushioning unit 5 such that assembly of the supporting unit 4, the cushioning unit 5 and the saddle base 2 is completed in a single step. Furthermore, the assembly of the saddle base 2, the foam padding 3 and the cover layer 6 can be smoothly completed.

Figure 6:
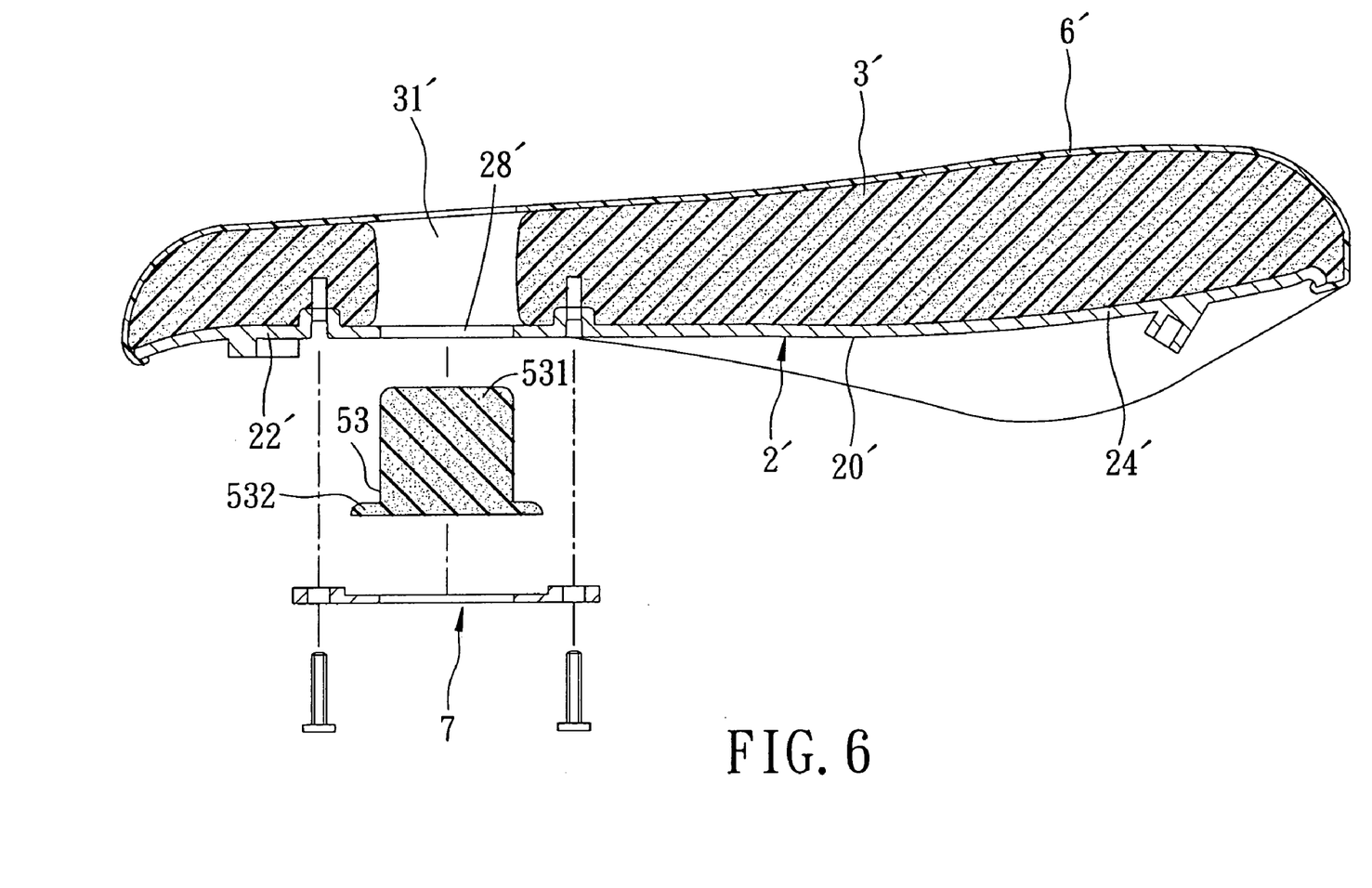
FIG. 6 is an exploded schematic sectional view showing the second preferred embodiment of a saddle device according to the present invention.
Figure 7:
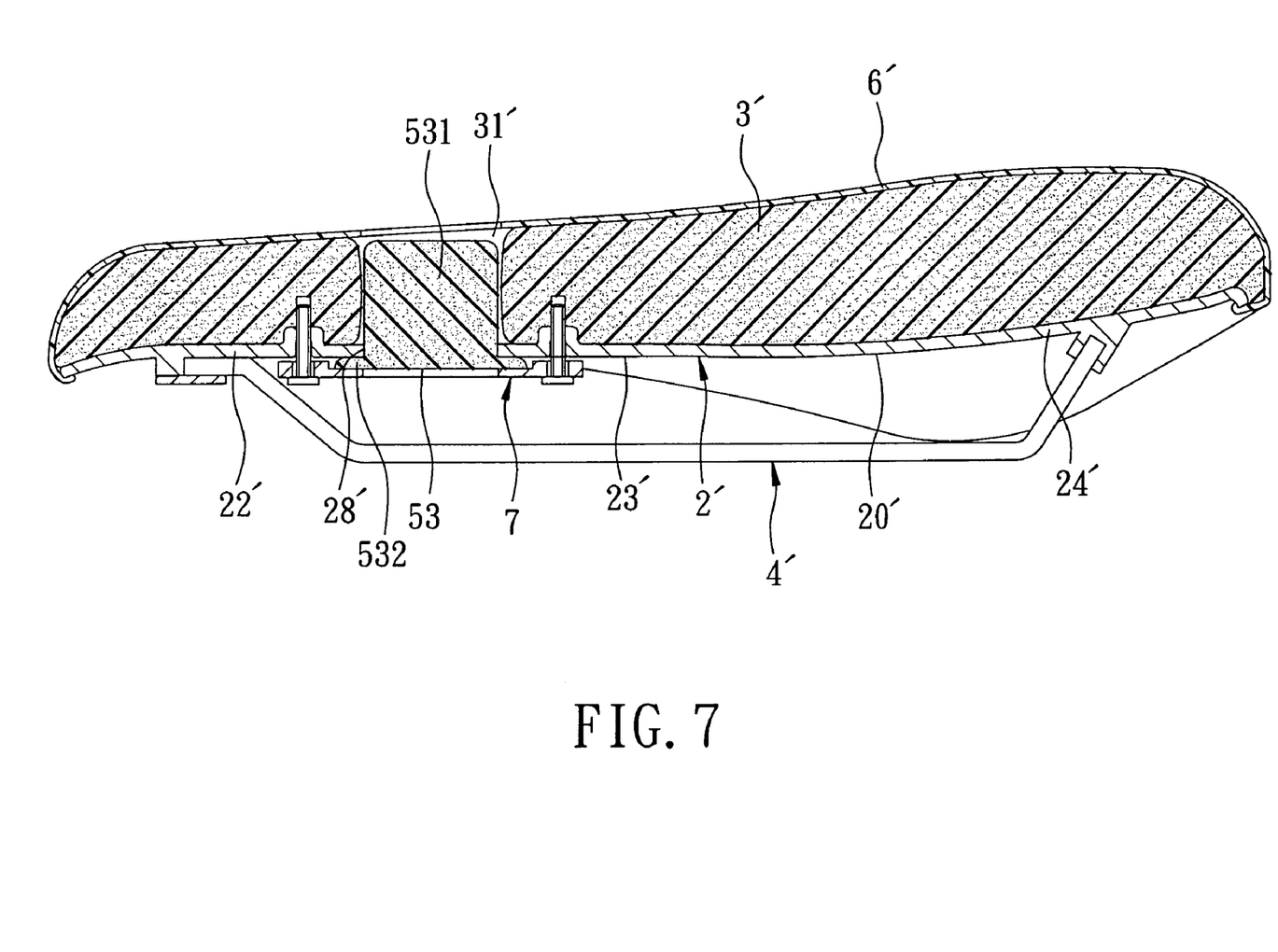
FIG. 7 is an assembled schematic sectional view showing the second preferred embodiment.
Figure 8:
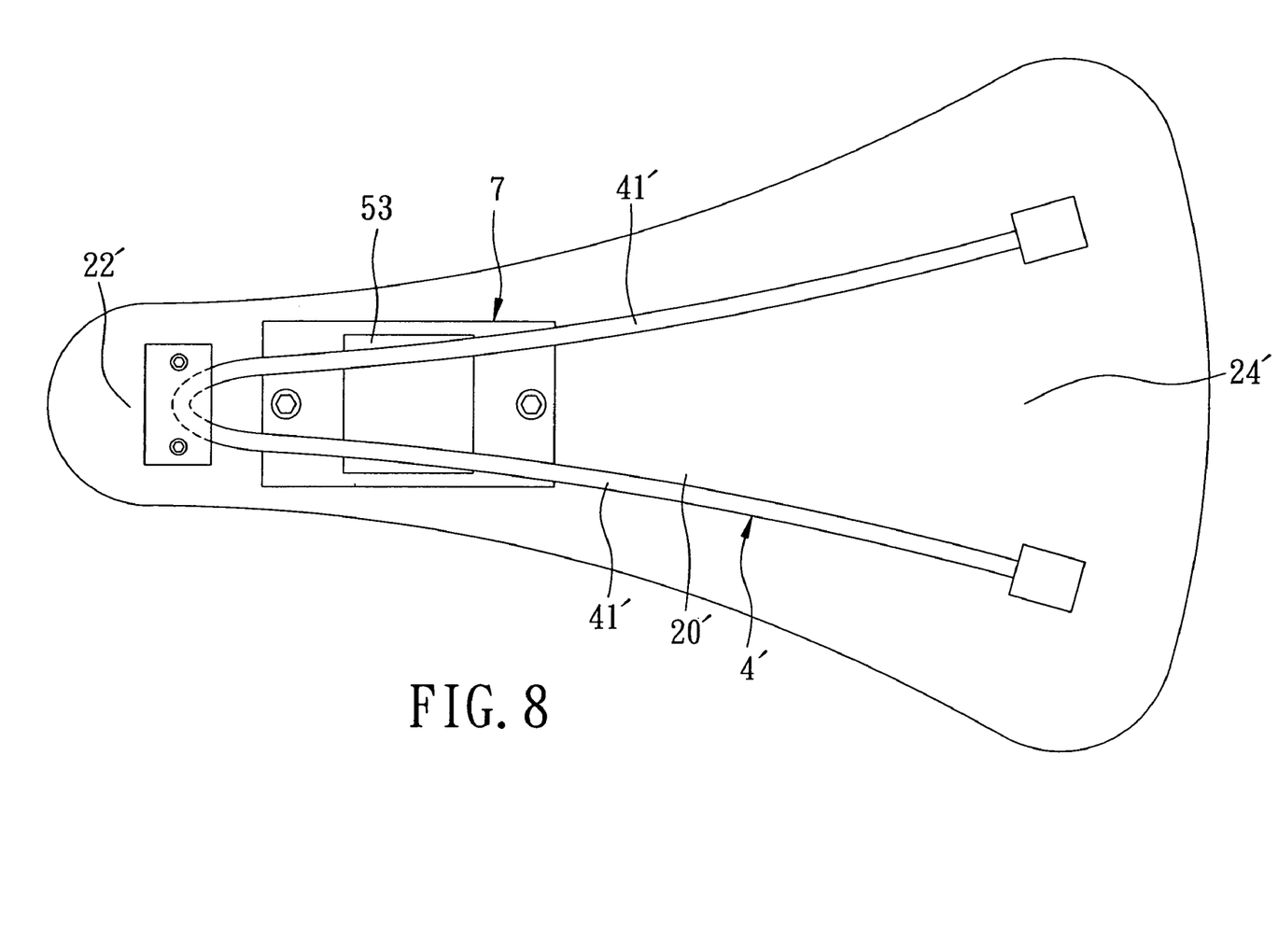
FIG. 8 is a schematic bottom view showing the second preferred embodiment.

FIGS. 6 to 8 illustrate the second preferred embodiment of a saddle device according to this invention, which is a modification of the first preferred embodiment. The support portion 20' of the saddle base 2' has a converging part 22', and a diverging part 24' disposed behind and wider than the converging part 22', as best shown in FIG. 8. Unlike the previous embodiment, the hole 28' is formed in the converging part 22' of the support portion 20' of the saddle base 2'.

In this embodiment, the supporting unit 4' only has two supporting rails 41', as shown in FIG. 8. Furthermore, the cushioning unit is a cushion member 53 that has a base portion 532 disposed fixedly between the supporting unit 4' and the inner surface 23' of the saddle base 2', and a cushioning portion 531 that extends integrally and upwardly from the base portion 532 and through the hole 28' in the saddle base 2' and the through hole 31' in the foam padding 3', as shown in FIG. 7.

In this embodiment, the saddle device further includes a mounting frame 7 bolted onto the inner surface 23' of the saddle base 2' for retaining the cushion member 53 on the saddle base 2'.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:
1. A saddle device comprising:
   a rigid saddle base having a support portion, a lateral flange extending downwardly from an outer periphery of said support portion, a concave inner surface, a convex outer surface, and a hole that extends from said outer surface to said inner surface;
   a foam padding mounted on said outer surface of said saddle base and formed with a through hole therethrough, said through hole being aligned with said hole in said saddle base;
   a supporting unit disposed fixedly under said saddle base;
   a resilient cushioning unit including a cushion member having a base portion disposed fixedly between said supporting unit and said inner surface of said saddle base, and a cushioning portion that extends integrally and upwardly from said base portion and through said hole in said saddle base and said through hole in said foam padding; and
   a cover layer for covering said foam padding, said cover layer having a transparent portion aligned with said through hole in said foam padding.

2. The saddle device as claimed in claim 1, wherein said support portion of said saddle base has a converging part, and a diverging part disposed behind and wider than said converging part, said hole in said saddle base being formed in said diverging part of said support portion.

3. The saddle device as claimed in claim 2, wherein said supporting unit includes a first mounting member mounted on said inner surface of said saddle base and proximate to said converging part, a second mounting member mounted on said inner surface of said saddle base and proximate to said diverging part, and two supporting rails inter connecting said first and second mounting members.

4. The saddle device as claimed in claim 3, wherein said cushioning unit further includes a cushion plate disposed between first mounting member and said inner surface of said saddle base, said inner surface of said saddle base being formed with a plurality of integral posts, each of which has a threaded hole, each of said cushion plate and said first mounting member of said supporting unit being formed with a hole therethrough, each of said cushion member and said second mounting members of said supporting unit being formed with two holes therethrough, said supporting unit further including a plurality of headed bolts that extend respectively through said holes in said first and second mounting members and through said holes in said cushion plate and said cushion member and that engage respectively said threaded holes in said posts on said inner surface of said saddle base so that said first and second mounting members are mounted respectively on said inner surface of said saddle base.

5. The saddle device as claimed in claim 1, wherein said support portion of said saddle base has a converging part, and a diverging part disposed behind and wider than said converging part, said hole being formed in said converging part of said support portion of said saddle base.

6. The saddle device as claimed in claim 5, further comprising amounting frame mounted on said inner surface of said saddle base for retaining said cushion member on said saddle base.

* * * * *